(12) United States Patent
Wang et al.

(10) Patent No.: US 10,807,184 B2
(45) Date of Patent: Oct. 20, 2020

(54) SIC INVERTED PLASMA CUTTING POWER SUPPLY

(71) Applicant: South China University of Technology, Guangzhou (CN)

(72) Inventors: Zhenmin Wang, Guangzhou (CN); Lei Zhu, Guangzhou (CN); Wenyan Fan, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 163 days.

(21) Appl. No.: 16/082,972

(22) PCT Filed: Mar. 13, 2017

(86) PCT No.: PCT/CN2017/076416
§ 371 (c)(1),
(2) Date: Sep. 7, 2018

(87) PCT Pub. No.: WO2018/107591
PCT Pub. Date: Jun. 21, 2018

(65) Prior Publication Data
US 2019/0084073 A1    Mar. 21, 2019

(30) Foreign Application Priority Data
Dec. 12, 2016  (CN) .......................... 2016 1 1138699

(51) Int. Cl.
*B23K 10/00* (2006.01)
*B23K 9/10* (2006.01)
*B23K 9/013* (2006.01)

(52) U.S. Cl.
CPC ............ *B23K 10/006* (2013.01); *B23K 9/013* (2013.01); *B23K 9/1006* (2013.01); *B23K 9/1012* (2013.01); *B23K 10/00* (2013.01)

(58) Field of Classification Search
CPC ...... B23K 10/006; B23K 9/013; B23K 9/006; B23K 9/1012; B23K 10/00; H05H 1/26; H05H 1/36
(Continued)

(56) References Cited

U.S. PATENT DOCUMENTS 9,510,436 B2 * 11/2016 Borowy ............... B23K 10/006
2011/0284506 A1 * 11/2011 Yokogawa ........ H01J 37/32036
219/121.54

FOREIGN PATENT DOCUMENTS

CN    21002167 Y    1/2008
CN    201002169 Y   1/2008
(Continued)

*Primary Examiner* — Mark H Paschall
(74) *Attorney, Agent, or Firm* — The Dobrusin Law Firm, P.C.

(57) ABSTRACT

The present invention provides an SiC inverted plasma cutting power supply, which is characterized in that: the SiC inverted plasma cutting power supply comprises a main circuit and a closed-loop control circuit; the main circuit comprises a sequentially connected noise suppression module, a power-frequency rectification and filtering module, an SiC inverter module, a power transformer, an SiC rectification and smoothing module and a non-contact arc initiation module, wherein the noise suppression module is connected to an alternating-current input power supply, and the SiC rectification and smoothing module and the non-contact arc initiation module are respectively connected to a load; the closed-loop control circuit comprises a man-machine interaction module, a DSC controller, a failure diagnosis and protection module, an SiC high-frequency drive module and a load electrical signal detection module. The power supply has high inverting frequency, small size, light weight, lower raw material consumption, high energy efficiency, an obvious energy saving effect and excellent dynamic characteristics, and can be applied on both a low-power occasion and (Continued)

medium and high power cutting occasions in a stable and reliable manner.

8 Claims, 5 Drawing Sheets

(58) Field of Classification Search
 USPC ............ 219/121.44, 121.39, 121.54, 121.57
 See application file for complete search history.

(56) References Cited

FOREIGN PATENT DOCUMENTS

| | | |
|---|---|---|
| CN | 201102120 Y | 8/2008 |
| CN | 101391336 A | 3/2009 |
| CN | 103551716 A | 2/2014 |
| CN | 106392262 A | 2/2017 |
| CN | 205967754 U | 2/2017 |
| CN | 206614131 U | 11/2017 |
| JP | S62292273 A | 12/1987 |
| JP | S6434580 A | 2/1989 |
| WO | 2016/073146 A1 | 5/2016 |

\* cited by examiner

SIC INVERTED PLASMA CUTTING POWER SUPPLY

FIELD OF THE INVENTION

The present invention relates to the field of high frequency inverted thermal cutting technology, and more particularly to an SiC inverted plasma cutting power supply.

BACKGROUND OF THE INVENTION

At present, high-efficiency energy-saving compact MOSFET or IGBT inverted plasma cutting power supplies have been widely used in the field of low-power cutting power supplies. In the medium and high power field, due to the high voltage and high power required by the process, a plasma cutting power supply based on rectification or chopping is still mainly used. Although the plasma cutting power supply is relatively reliable and technically mature, it is bulky and cumbersome, and has low energy consumption and efficiency as well as nonideal dynamic and static characteristics due to its structural reasons, which limit the further improvement of cutting quality. Besides, the Si-based power rectifier diode has a conductance modulation effect, and a very obvious reverse recovery effect in the turn-off process, which is prone to high voltage spikes and endangers the working safety of the main circuit. In addition, the plasma arc cutting power supply has a high no-load voltage, and a very large transient current surge at the moment of arc initiation cutting. The above factors lead to the result that the reliability of the high-power inverted plasma cutting power supply has not been well improved, and the industrial production still lacks the medium and high power inverted plasma cutting power supply.

CONTENTS OF THE INVENTION

A purpose of the present invention is to overcome the shortcomings and deficiencies in the prior art and to provide an SiC inverted plasma cutting power supply. The power supply has high inverting frequency, small size, light weight, lower raw material consumption, high energy efficiency, an obvious energy saving effect and excellent dynamic characteristics, and can be applied on both a low-power occasion and a medium and high power cutting occasion in a stable and reliable manner.

In order to achieve the above purpose, the present invention adopts the following technical solution: An SiC inverted plasma cutting power supply is provided, characterized in that: the power supply comprises a main circuit and a closed loop control circuit; the main circuit comprises a sequentially connected noise suppression module, a power-frequency rectification and filtering module, an SiC inverter module, a power transformer, an SiC rectification and smoothing module and a non-contact arc initiation module, wherein the noise suppression module is connected to an alternating-current input power supply, and the SiC rectification and smoothing module and the non-contact arc initiation module are respectively connected to a load;

the closed-loop control circuit comprises a man-machine interaction module, a DSC controller, a failure diagnosis and protection module, an SiC high-frequency drive module and a load electrical signal detection module; the man-machine interaction module, the failure diagnosis and protection module, the SiC high-frequency drive module, the load electrical signal detection module and the non-contact arc initiation module are respectively connected to the DSC controller; the failure diagnosis and protection module is further connected to the SiC inverter module and the power transformer, respectively; the SiC high-frequency drive module is also connected to the SiC inverter module; the load electrical signal detection module is also connected to the SiC rectification and smoothing module.

Preferably, the power-frequency rectification and filtering module includes a rectifier BR1, an inductor L1 and a capacitor C11;

the SiC inverter module includes SiC power switching devices Q1, Q2, Q3 and Q4, resistors R1, R2, R3 and R4, and capacitors C1, C2, C3, C4 and Cr;

the power transformer includes a transformer T1, a capacitor C12 and a resistor R12;

the SiC rectification and smoothing module includes SiC rectifier diodes D1, D2, D3 and D4, capacitors C5, C6, C7, C8, C9 and C10, resistors R5, R6, R7, R8 and R9, piezoresistors YR1, YR2, YR3 and YR4, and an inductor L2;

the noise suppression module is connected to the input end of the rectifier BR1; the inductor L1 and the capacitor C11 are connected in series, and then connected in parallel to the output end of the rectifier BR1;

the capacitor C11 is connected in parallel with a series circuit composed of the SiC power switching devices Q1 and Q2, and is connected in parallel with a series circuit composed of the SiC power switching devices Q3 and Q4; the resistor R1 and the capacitor C1 are connected in series and then connected in parallel to the SiC power switching device Q1; the resistor R2 and the capacitor C2 are connected in series and then connected in parallel to the SiC power switching device Q2; the resistor R3 and the capacitor C3 are connected in series and then connected in parallel to the SiC power switching device Q3; the resistor R4 and the capacitor C4 are connected in series and then connected in parallel to the SiC power switching device Q4; the connection point of the SiC power switching devices Q1 and Q2 is connected to the connection point of the SiC power switching devices Q3 and Q4 through the capacitor Cr and the primary side of the transformer T1; the capacitor C12 and the resistor R12 are connected in series and then connected in parallel to the primary side of the transformer T1; the secondary side of the transformer T1 is connected in parallel with the series circuit composed of the SiC rectifier diodes D1 and D2, and is connected in parallel with the series circuit composed of the SiC rectifier diodes D3 and D4; the capacitor C5 and the resistor R5 are connected in series and are respectively connected in parallel with the SiC rectifier diode D1 and the piezoresistor YR1; the resistor R6 and the capacitor C6 are connected in series and are respectively connected in parallel with the SiC rectifier diode D2 and the piezoresistor YR2; the capacitor C7 and the resistor R7 are connected in series and are respectively connected in parallel with the SiC rectifier diode D3 and the piezoresistor YR3; the resistor R8 and the capacitor C8 are connected in series and are respectively connected in parallel with the SiC rectifier diode D4 and the piezoresistor YR4; the connection point of the SiC rectifier diodes D1 and D2 is connected to the connection point of the SiC rectifier diodes D3 and D4 through the inductor L2 and the capacitor C9; the resistor R9 and the capacitor C10 are connected in parallel to the capacitor C9, respectively; one end of the capacitor C10 is connected to the positive end of the load, and the other end of the capacitor C10 is connected to the negative end of the load through the primary side of the coupling transformer T2; the secondary side of the coupling transformer T2 is connected to the non-contact arc initiation module.

Preferably, the non-contact arc initiation module includes a trigger of Model IC1 555, an SiC-type field effect transistor Q110, a step-up transformer T103, a rectifier bridge B101, dischargers 101 and 102, a high-voltage charging capacitor C106, and other peripheral auxiliary circuits.

Preferably, the SiC high-frequency drive module includes field effect transistors M201, M202, M203 and M204, transformers T201 and T202, four SiC drive circuits, and other peripheral auxiliary circuits.

Preferably, the load electrical signal detection module includes a current sampling circuit and a voltage division sampling circuit; the current sampling circuit includes a Hall current sensor, a chip U301 of Model AD629, a chip U302 of Model OP177, and other peripheral auxiliary circuits; the voltage division sampling circuit includes a voltage dividing unit composed of resistors R401 and 402, a chip U401 of Model LF353, a chip U402 of Model HCNR201, and other peripheral auxiliary circuits.

Preferably, the failure diagnosis and protection module includes an overvoltage-undervoltage monitoring circuit, a phase loss detection circuit and an overheat detection circuit; the overvoltage-undervoltage monitoring circuit includes a bridge circuit composed of resistors R513, R514, R517 and R518, a VCC DC source, comparators U501 and U502, optocouplers U515 and U516, and other peripheral auxiliary circuits; the phase loss detection circuit includes a comparator U503, an optocoupler U514, and other peripheral auxiliary circuits.

Preferably, the noise suppression module includes a three-phase common mode inductor $L_{cm}$, a three-phase differential mode inductor $L_{dm}$, an X capacitor, a Y capacitor, and a leak resistor.

Preferably, the DSC controller includes a DSC microprocessor embedded with an FREERTOS system, a power supply unit, an external clock oscillating unit, a reset unit, and a JTAG debug interface.

The basic principle of the innovative design of the power supply of the present invention is as follows: Firstly, since the SiC power device has a fast switching speed and low switching loss, the ultra-high frequency inverted technology based on the SiC power device can greatly improve the inverting frequency of the power supply, thereby making the magnetic power device of the main circuit of the power supply and the smoothing filter device greatly reduced in the volume and weight and further improved in the energy transfer efficiency. Secondly, since the SiC power device has almost no conductance modulation effect, it has no reverse recovery effect in the switching process, which makes large voltage and current spikes not easy to be generated, greatly improving the working stress environment of the device and increasing the reliability. Thirdly, the SiC power device has higher heat resistance, improved reliability, greatly reduced volume and weight of the heat sink, smaller volume, lighter weight, higher power density, and lower overall manufacturing cost. Finally, due to the increase of the operating frequency, the dynamic characteristics of the power supply are significantly improved, so that the control of the cutting current by the power supply is more refined, and the cutting quality is easy to be improved.

The working principle of the power supply of the present invention is as follows: The three-phase/single-phase AC input power supply is rectified and filtered by the power-frequency rectification and filtering module to form a direct current, which is converted into a high frequency alternating square wave pulse of 200 kHz or higher by being ultra-high frequency switched by the SiC inverter module and, after high-frequency conversion isolation of a power transformer, is rectified and smoothed by the SiC rectification and smoothing module into a DC power supply suitable for plasma cutting.

The non-contact arc initiation module is used for generating high-frequency high-voltage electric pulses, so as to break the air gap between the plasma cutting gun and the workpiece and realize reliable arc initiation; the load electrical signal detection module is mainly used for real-time detection of the current and voltage waveforms outputted by the plasma cutting power supply, and for providing the current and voltage waveforms to the DSC controller; the man-machine interaction module is mainly used for implementing functions such as preset of process parameters and display of status; mainly based on the preset value of the man-machine interaction module and the feedback current/voltage value provided by the load electrical signal detection module, the DSC controller generates a suitable PWM control signal, which is converted by the SiC high-frequency drive module into a PWM drive signal suitable for the SiC power switching device in the SiC inverter module to realize ultra-high frequency drive modulation; the failure diagnosis and protection module mainly detects overheating, overvoltage, undervoltage, phase loss and other failures of the main circuit, and feeds back status information to the DSC controller to realize safety protection of the power supply.

Compared with the prior art, the present invention has the following advantages and benefits:

1. The power supply of the present invention has better cutting quality; all power switching devices use a new generation of power electronic devices based on SiC having an inverting frequency over 200 kHz, which is more than ten times that of the existing IGBT inverted plasma cutting power supply, with the overall machine having better dynamic characteristics and able to achieve fine control of the plasma cutting arc and better cutting quality; the power supply of the present invention can be applied on both a low power occasion and medium and high power cutting occasions in a stable and reliable manner;

2. the power supply of the present invention has higher reliability; the SiC power switching device has almost no conductance modulation effect and low working stress, and has higher thermal resistance, higher voltage-withstand performance, and wider band gap compared with current common Si-based MOSFETs/IGBTs, and therefore the reliability under high-voltage plasma cutting conditions is more easily guaranteed;

3. the overall manufacturing cost of the power supply of the present invention is lower; in the present invention, the power switching device has less loss, its energy efficiency can exceed 96%, and its required heat sink has a smaller volume; besides, as the inverting frequency increases, the volumetric weight of the magnetic device and the smoothing filter device of the main circuit is also greatly reduced; therefore, the present invention has higher power density, lower overall manufacturing cost, and high cost performance.

DETAILED DESCRIPTION OF THE EMBODIMENTS

The present invention will be further described below in detail with reference to drawings and specific embodiments.

Example

As shown in FIGS. 1-8, the SiC inverted plasma cutting power supply of the present embodiment includes a main circuit and a closed loop control circuit; the main circuit comprises a sequentially connected noise suppression module, a power-frequency rectification and filtering module, an SiC inverter module, a power transformer, an SiC rectification and smoothing module and a non-contact arc initiation module, wherein the noise suppression module is connected to an alternating-current input power supply, and the SiC rectification and smoothing module and the non-contact arc initiation module are respectively connected to a load.

Figure 1:
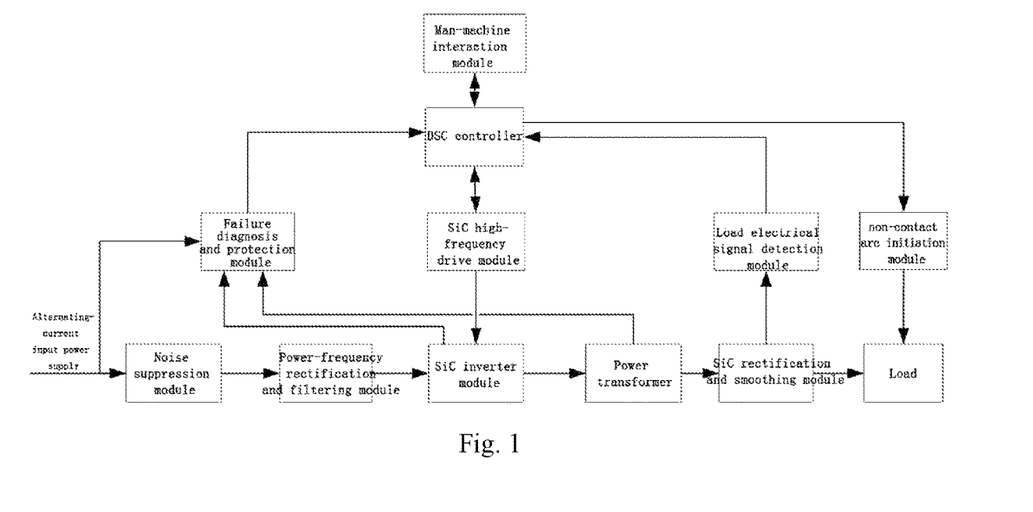
FIG. 1 is a block diagram showing the principle of the system of the power supply of the present invention.
Figure 3:
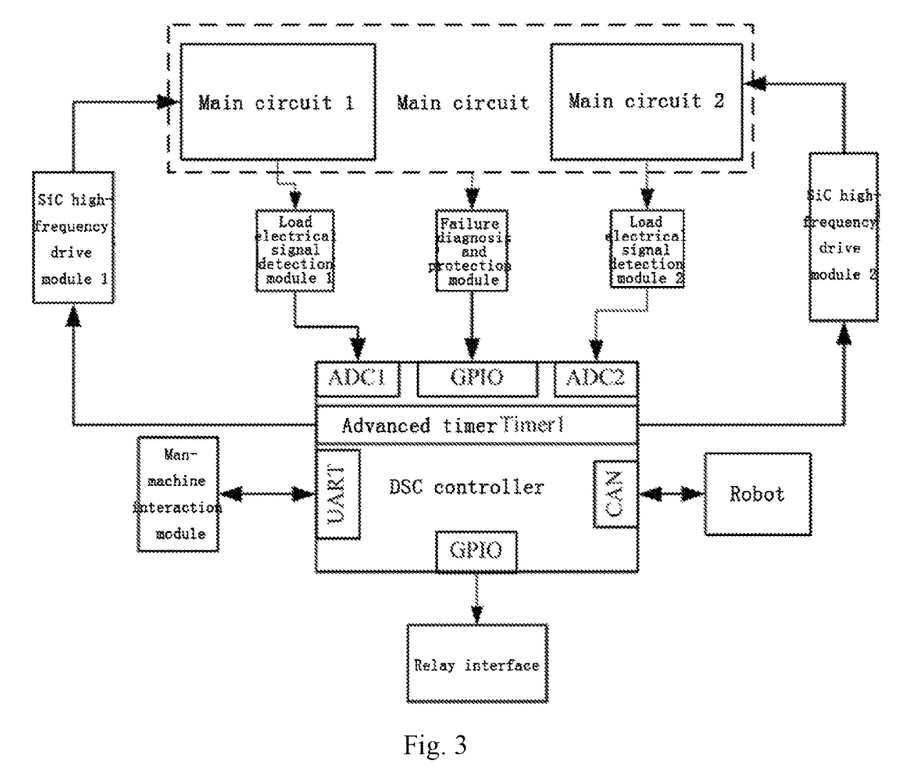
FIG. 3 is a block diagram showing the principle of the closed loop control circuit of the power supply of the present invention.

The closed-loop control circuit comprises a man-machine interaction module, a DSC controller, a failure diagnosis and protection module, an SiC high-frequency drive module and a load electrical signal detection module; the man-machine interaction module, the failure diagnosis and protection module, the SiC high-frequency drive module, the load electrical signal detection module and the non-contact arc initiation module are respectively connected to the DSC controller; the failure diagnosis and protection module is further connected to the SiC inverter module and the power transformer, respectively; the SiC high-frequency drive module is also connected to the SiC inverter module; the load electrical signal detection module is also connected to the SiC rectification and smoothing module.

Figure 2:
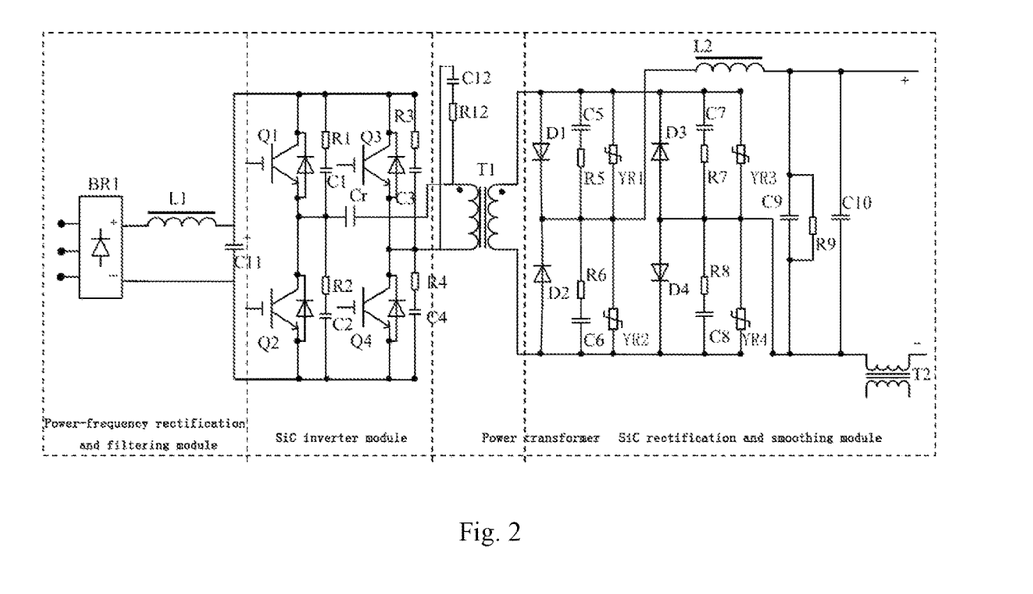
FIG. 2 is a schematic diagram of the main circuit of the power supply of the present invention.

In the main circuit, the power-frequency rectification and filtering module comprises a rectifier BR1, an inductor L1 and a capacitor C11; the SiC inverter module includes SiC power switching devices Q1, Q2, Q3 and Q4, resistors R1, R2, R3 and R4, and capacitors C1, C2, C3, C4 and Cr; the power transformer includes a transformer T1, a capacitor C12 and a resistor R12; the SiC rectification and smoothing module includes SiC rectifier diodes D1, D2, D3 and D4, capacitors C5, C6, C7, C8, C9 and C10, resistors R5, R6, R7, R8 and R9, piezoresistors YR1, YR2, YR3 and YR4, and an inductor L2.

The noise suppression module is connected to an input end of the rectifier BR1; the inductor L1 and the capacitor C11 are connected in series, and then connected in parallel to the output end of the rectifier BR1; the capacitor C11 is connected in parallel with a series circuit composed of the SiC power switching devices Q1 and Q2, and is connected in parallel with a series circuit composed of the SiC power switching devices Q3 and Q4; the resistor R1 and the capacitor C1 are connected in series and then connected in parallel to the SiC power switching device Q1; the resistor R2 and the capacitor C2 are connected in series and then connected in parallel to the SiC power switching device Q2; the resistor R3 and the capacitor C3 are connected in series and then connected in parallel to the SiC power switching device Q3; the resistor R4 and the capacitor C4 are connected in series and then connected in parallel to the SiC power switching device Q4; the connection point of the SiC power switching devices Q1 and Q2 is connected to the connection point of the SiC power switching devices Q3 and Q4 through the capacitor Cr and the primary side of the transformer T1; the capacitor C12 and the resistor R12 are connected in series and then connected in parallel to the primary side of the transformer T1; the secondary side of the transformer T1 is connected in parallel with the series circuit composed of the SiC rectifier diodes D1 and D2, and is connected in parallel with the series circuit composed of the SiC rectifier diodes D3 and D4; the capacitor C5 and the resistor R5 are connected in series and are respectively connected in parallel with the SiC rectifier diode D1 and the piezoresistor YR1; the resistor R6 and the capacitor C6 are connected in series and are respectively connected in parallel with the SiC rectifier diode D2 and the piezoresistor YR2; the capacitor C7 and the resistor R7 are connected in series and are respectively connected in parallel with the SiC rectifier diode D3 and the piezoresistor YR3; the resistor R8 and the capacitor C8 are connected in series and are respectively connected in parallel with the SiC rectifier diode D4 and the piezoresistor YR4; the connection point of the SiC rectifier diodes D1 and D2 is connected to the connection point of the SiC rectifier diodes D3 and D4 through the inductor L2 and the capacitor C9; the resistor R9 and the capacitor C10 are connected in parallel to the capacitor C9, respectively; one end of the capacitor C10 is connected to the positive end of the load, and the other end of the capacitor C10 is connected to the negative end of the load through the primary side of the coupling transformer T2; the secondary side of the coupling transformer T2 is connected to the non-contact arc initiation module.

According to different commutation modes of the SiC power switching devices Q1, Q2, Q3 and Q4, the resistors R1, R2, R3 and R4 may have zero resistance.

The DSC controller includes a DSC microprocessor embedded with an FREERTOS system, a power supply unit, an external clock oscillating unit, a reset unit, and a JTAG debug interface.

The power supply of the present invention may adopt a single main circuit, or may adopt multiple main circuits connected in parallel to further enhance the output power, as shown in FIG. 3 which is a structural block diagram of the closed loop control circuit system when the present invention adopts the dual main circuits connected in parallel. The closed loop control circuit is mainly composed of a DSC controller, a man-machine interaction module, a failure diagnosis and protection module, load electrical signal detection modules 1 and 2, SiC high-frequency drive modes 1 and 2, an extended relay interface, and a CAN bus interface. The extended relay interface is mainly used for controlling the start and stop of the non-contact arc initiation module and the auxiliary air supply device and cooling device, and the like. The CAN bus interface is mainly used for digital cooperative communication control with devices such as robots. The DSC controller performs digital communication with the man-machine interaction module through the UART port, receives preset process parameter information, and displays real-time status information of the power supply system on the man-machine interaction module. The advanced timer TIMER1 of the DSC controller simultaneously generates multiple digital PWM signals, which are inputted to the SiC high frequency drive modes 1 and 2 to respectively drive the main circuits 1 and 2. The load electrical signal detection modules 1 and 2 respectively collect current and voltage signals of the main circuits 1 and 2, and feed back to the DSC controller, thereby respectively forming a closed control loop for the two main circuits. The failure diagnosis and protection module detects overvoltage, undervoltage and phase loss as well as overheating of each main circuit; as soon as a failure occurs, the output level of the failure diagnosis and protection module will be reversed and inputted to the GPIO port of the DSC controller, so as to trigger the interrupt task and turn off the PWM output to protect the overall power supply.

Figure 4:
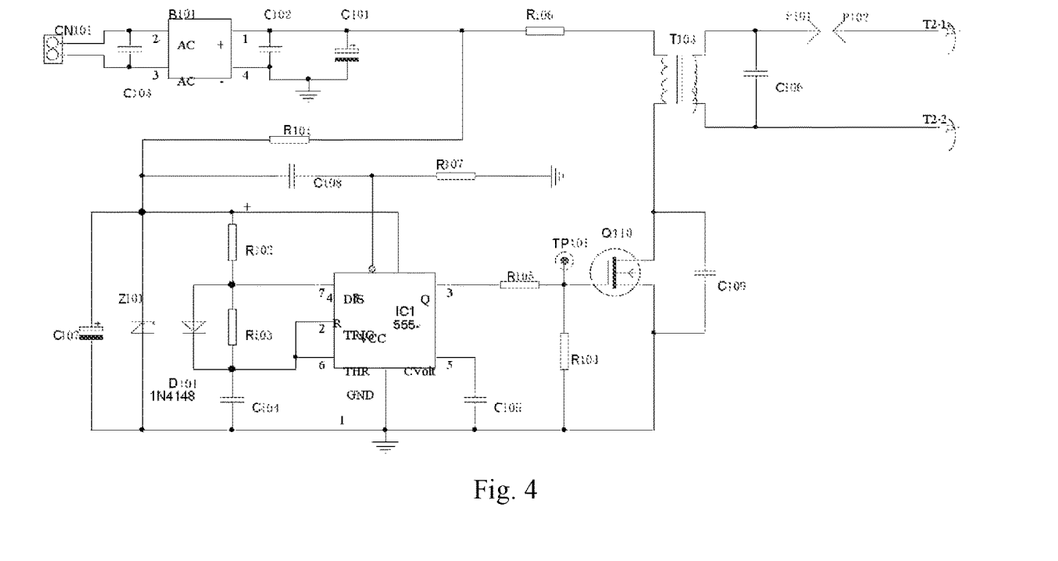
FIG. 4 is a circuit schematic diagram of the non-contact arc initiation module in the power supply of the present invention.

The non-contact arc initiation module includes a trigger of Model IC1 555, an SiC-type field effect transistor Q110, a step-up transformer T103, a rectifier bridge B101, dischargers 101 and 102, a high-voltage charging capacitor C106, and other peripheral auxiliary circuits. The DSC controller controls the input of the rectifier bridge B101 through the relay interface. The pulse trigger circuit with the trigger of Model IC1 555 as the core controls the fast switching of the SiC-type field effect transistor Q110. The primary side of the step-up transformer T103 is made to obtain a high-frequency pulse signal, and is then boosted to charge C106 until the breakdown voltages of the dischargers P101 and P102 are reached. The spark discharger discharges after the air gap is broken, and the equivalent resistor R of the dischargers P101 and P102, the charge-discharge capacitor C106, and the primary inductor L of the coupling transformer T2 form an RLC oscillation and generate a high-frequency high-voltage signal, which is applied between the electrode and the nozzle through the secondary T2-1 and T2-2 of the coupling transformer T2 to form a plasma arc initiation path, thereby achieving non-contact arc initiation.

Figure 5:
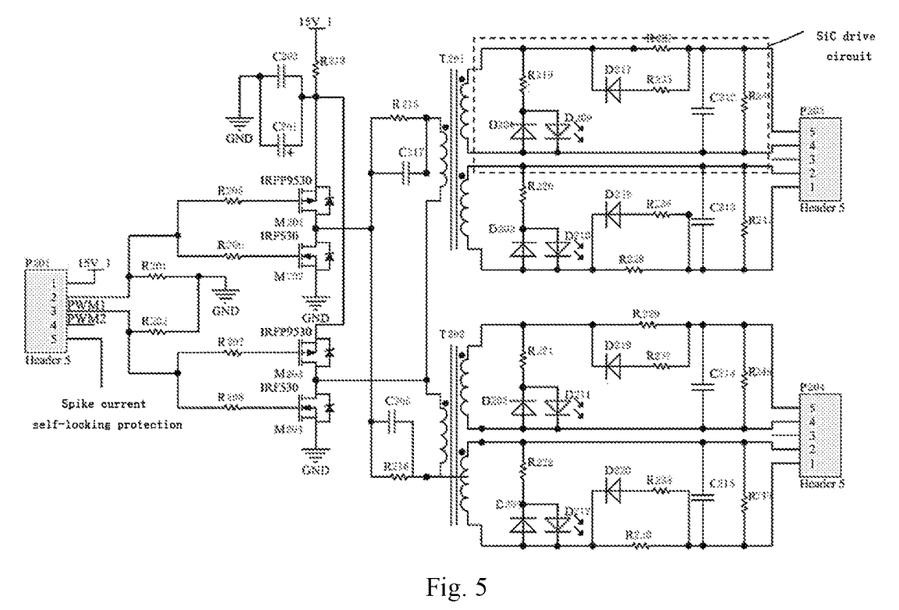
FIG. 5 is a circuit schematic diagram of the SiC high-frequency drive module in the power supply of the present invention.

The SiC high-frequency drive module includes field effect transistors M201, M202, M203 and M204, transformers T201 and T202, four SiC drive circuits, and other peripheral auxiliary circuits. The PWM signal generated by the DSC controller is isolated and amplified, and then inputted to the connector P201, and directly drives the push-pull output circuit composed of the field effect transistors M201, M202, M203 and M204 through a current limiting resistor. The push-pull output circuit drives the transformers T201 and T202, and generates four IGBT drive signals through commutation of four SiC drive circuits. The resistors R227 and R235, the diode D217, and the capacitor C212 in the first SiC drive circuit constitute a "slow-on fast-off" network of SiC. The resistor R215 with a large resistance value limits the charging current when the SiC is turned on, thereby increasing the time for the SiC to establish the turn-on voltage, achieving the effect of slow on, and suppressing the du/dt of the turn-on process. The charged capacitor C217 and the low resistance loop formed by the diode D209 and the resistor R219 accelerate the charge release rate of the parasitic capacitor when the SiC is turned off, thus realizing the fast turn-off of the SiC. This "slow-on fast-off" measure reduces the switching loss of SiC to a certain extent, and the higher the operating frequency of the SiC, the more obvious this positive effect will be. The resistor R246 is the gate resistor of SiC, and its introduction avoids the erroneous triggering of SiC caused by the charge storage of the gate parasitic capacitor of the SiC in the off state, thus playing a protective role.

Figure 6A:
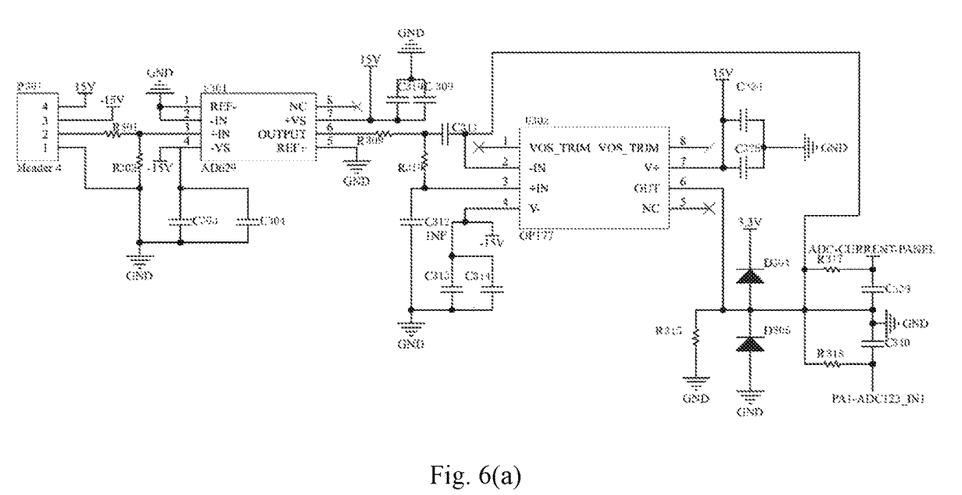
FIG. 6(a) is a circuit schematic diagram of the current sampling circuit of the load electrical signal detection module in the power supply of the present invention.
Figure 6B:
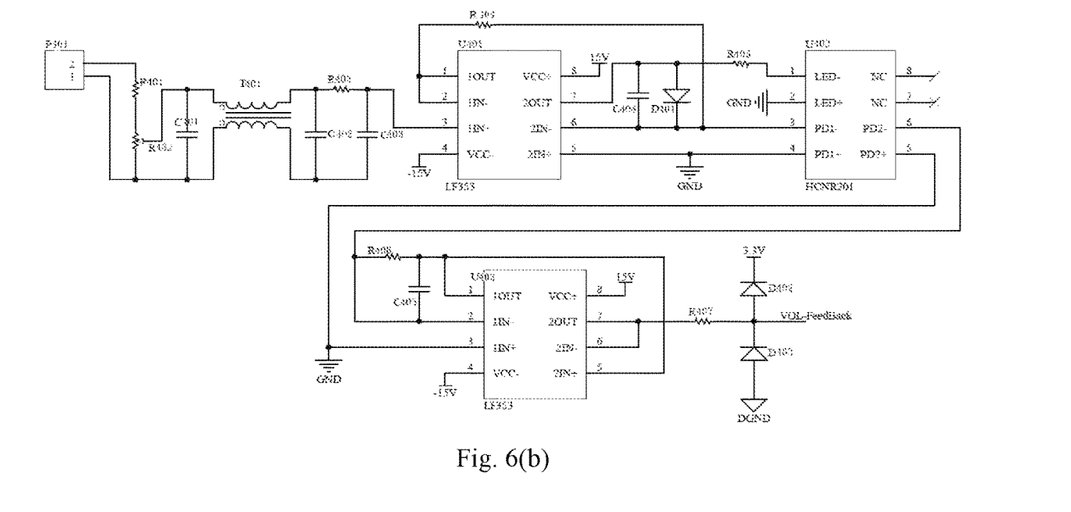
FIG. 6(b) is a circuit schematic diagram of the voltage division sampling circuit of the load electrical signal detection module in the power supply of the present invention.

The load electrical signal detection module includes a current sampling circuit and a voltage divider sampling circuit. The current sampling circuit includes a Hall current sensor, a chip U301 of Model AD629, a chip U302 of Model OP177, and other peripheral auxiliary circuits. The Hall current is directly inputted to the connector P301. The voltage division sampling circuit includes a voltage dividing unit composed of resistors R401 and 402, a chip U401 of Model LF353, a chip U402 of Model HCNR201, and other peripheral auxiliary circuits.

Figure 7A:
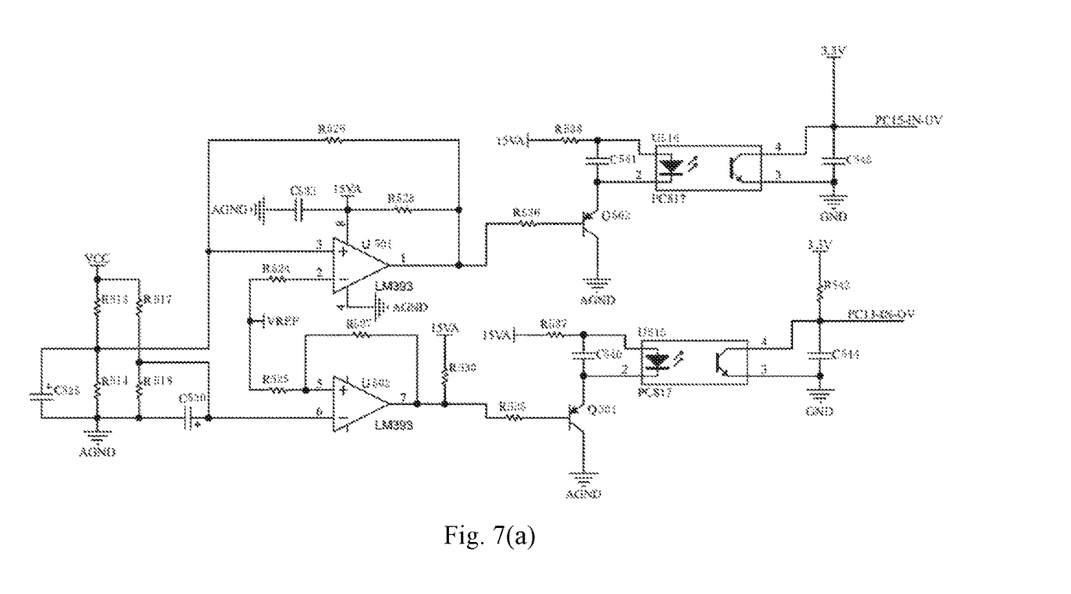
FIG. 7(a) is a circuit schematic diagram of the overvoltage-undervoltage monitoring circuit of the failure diagnosis and protection module in the power supply of the present invention.

The failure diagnosis and protection module includes an overvoltage-undervoltage monitoring circuit, a phase loss detection circuit and an overheat detection circuit. The overvoltage-undervoltage monitoring circuit includes a bridge circuit composed of resistors R513, R514, R517 and R518, a VCC DC source, comparators U501 and U502, optocouplers U515 and U516, and other peripheral auxiliary circuits. After the step-down, rectification and filtering of the transformer, the VCC DC source provides a DC voltage signal, which is then proportionally reduced to different voltage values through the bridge circuit composed of the resistors R513, R514, R517 and R518, and then respectively inputted to the inverting and non-inverting input ends of the comparators U501 and U502, and compared with the set reference voltage VREF. In the event of overvoltage or undervoltage, the optocoupler turns on, which triggers the interrupt port of the DSC microprocessor to call the failure handling task.

Figure 7B:
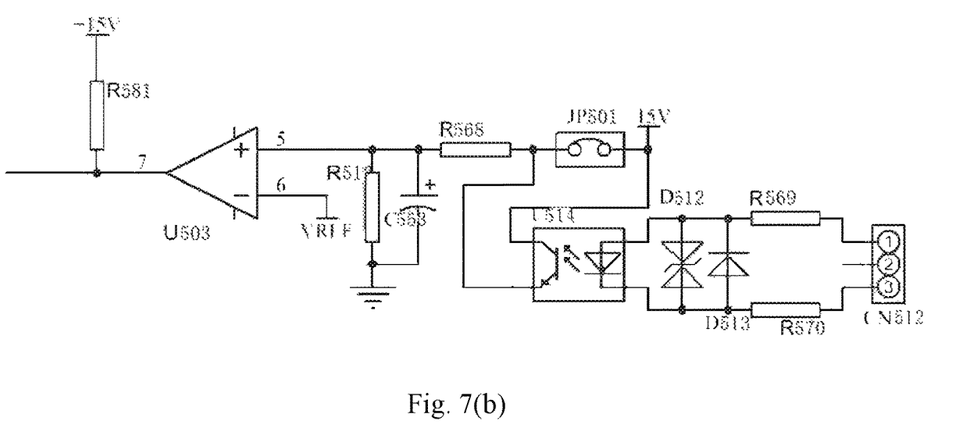
FIG. 7(b) is a circuit schematic diagram of the phase loss detection circuit of the failure diagnosis and protection module in the power supply of the present invention.

The phase loss detection circuit includes a comparator U503, an optocoupler U514, and other peripheral auxiliary circuits. When the three phases are balanced, the resistors R569 and R570 have high voltage at both ends. The input end of the optocoupler U514 is regulated to 15V through D512. At this time, the output is at a high level and, after being divided by the resistors R568 and R512, is compared with VREF, and the comparator U503 outputs a high level signal. When one of the phase circuits is out of phase, the optocoupler U514 does not work, and the output is approximately at a zero level. At this time, the comparator U503 outputs a low level signal, which is inputted to the interrupt port of the DSC controller through the optocoupler isolation circuit, such that the failure protection interrupt subprogram is triggered and the PWM output is turned off to stop the cutting power supply for the protection purpose.

Figure 7C:
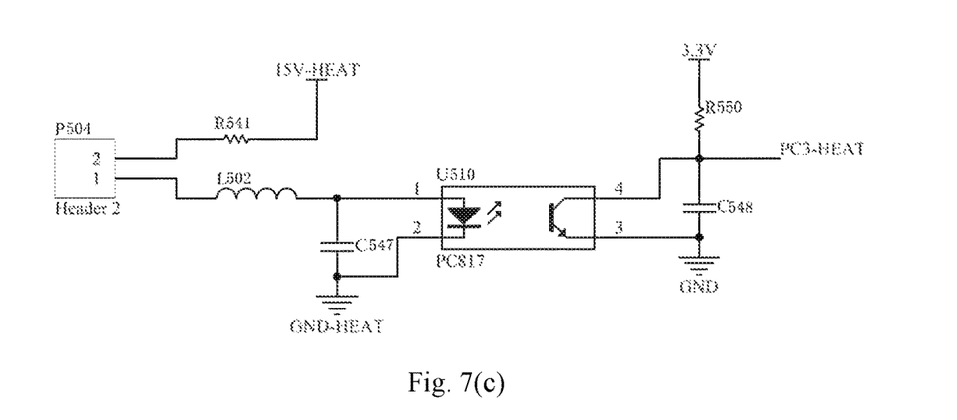
FIG. 7(c) is a circuit schematic diagram of the overheat detection circuit of the failure diagnosis and protection module in the power supply of the present invention.

The overheat detection circuit is mainly composed of a temperature control switch, resistors R541 and R550, capacitors C547 and C548, an inductor L502, and an optocoupler U510. Among them, the temperature control switch inputs the connector P504; the temperature control switch detects the temperature of the heat sink of the power transformer and the SiC power switching device in real time; when the actual temperature exceeds the preset threshold, the temperature control switch is closed, the optocoupler U510 is turned on, and the level signal of the GPIO port pin (PC3-IN-OH-2) of the DSC controller is pulled low, triggering the overheat protection interrupt subprogram for overheat protection.

Figure 8:
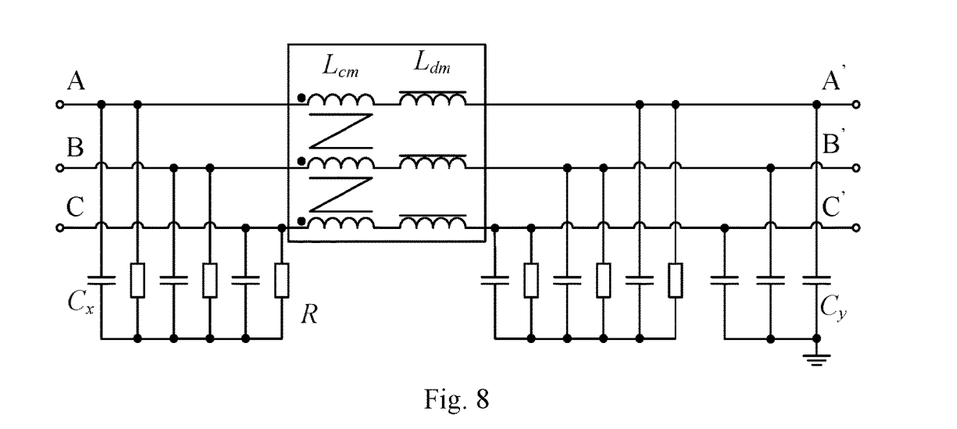
FIG. 8 is a circuit schematic diagram of the noise suppression module in the power supply of the present invention.

The noise suppression module includes a three-phase common mode inductor $L_{cm}$, a three-phase differential mode inductor $L_{dm}$, an X capacitor $C_x$, a Y capacitor $C_y$, and a leak resistor R. Among them, A, B and C are connected to the AC input power supply, and A', B' and C' are connected to the power-frequency rectification and filtering module; the X capacitor $C_x$ is mainly used to filter out common mode noise, and the Y capacitor $C_y$ is mainly used to filter out differential mode noise; the three-phase common mode inductor $L_{cm}$ is mainly used to filter out common mode noise, and the three-phase differential mode inductor $L_{dm}$ is mainly used to filter out differential mode noise.

The basic principle of the innovative design of the power supply of the present invention is as follows: Firstly, since the SiC power device has a fast switching speed and low switching loss, the ultra-high frequency inverted technology based on the SiC power device can greatly improve the inverting frequency of the power supply, thereby making the magnetic power device of the main circuit of the power supply and the smoothing filter device greatly reduced in the volume and weight and further improved in the energy transfer efficiency. Secondly, since the SiC power device has almost no conductance modulation effect, it has no reverse recovery effect in the switching process, which makes large voltage and current spikes not easy to be generated, greatly improving the working stress environment of the device and increasing the reliability. Thirdly, the SiC power device has higher heat resistance, improved reliability, greatly reduced volume and weight of the heat sink, smaller volume, lighter weight, higher power density, and lower overall manufacturing costs. Finally, due to the increase of the operating frequency, the dynamic characteristics of the power supply are significantly improved, so that the control of the cutting current by the power supply is more refined, and the cutting quality is easy to be improved.

When the present invention is applied, an AC input power is first converted into a smooth DC power by a noise suppression module and a power-frequency rectification and filtering module; the DSC controller compares the preset value transmitted by the man-machine interaction module with the actual output value detected by the load electrical signal detection module, and performs an operation according to a preset algorithm to obtain a digital PWM signal with a corresponding duty ratio and frequency; the digital PWM signal, after being isolated and amplified by the SiC high-frequency drive module, drives the SiC power switching device in the SiC inverter module to perform high-frequency switching according to a preset commutation mode, so that the direct current is converted into an ultra-high frequency alternating square wave pulse; the ultra-high frequency alternating square wave pulse is subjected to isolation, step-down and power transfer by a power transformer, and then converted by the SiC rectification and smoothing module into a smooth direct current to be supplied to the arc load; once the DSC controller detects the cutting start command, it will first control the action of the non-contact arc initiation module to realize the non-contact arc initiation; after the arc initiation is successful, the non-contact arc initiation module is turned off, and the cutting power supply enters the normal control flow; the failure diagnosis and protection module detects the working status of the power supply in real time; in the event of overvoltage, undervoltage, phase loss, overheating, etc., the failure diagnosis and protection module will trigger the failure interrupt task of the DSC controller to achieve safety protection of the system.

The above-described examples are preferred embodiments of the present invention, but the embodiments of the present invention are not limited thereto, and any other alterations, modifications, substitutions, combinations and simplifications should be equivalent replacements and included in the scope of protection of the present invention.

The invention claimed is:

1. An SiC inverted plasma cutting power supply, characterized in that: the SiC inverted plasma cutting power supply comprises a main circuit and a closed loop control circuit; the main circuit comprises, sequentially connected, a noise suppression module, a power-frequency rectification and filtering module, an SiC inverter module for preforming high-frequency switching, a power transformer, an SiC rectification and smoothing module, and a non-contact arc initiation module for generating high-frequency high-voltage electric pulses;

wherein the noise suppression module is connected to an alternating-current input power supply, and the SiC rectification and smoothing module and the non-contact arc initiation module are respectively connected to a load;

the closed loop control circuit comprises a man-machine interaction module for displaying of status of the power supply, a DSC controller, a failure diagnosis and protection module for detecting the status of the power supply in real time and for protecting the power supply in an event of failure, a SiC high-frequency drive module, and a load electrical signal detection module for detecting a current and a voltage waveforms outputted by the power supply;

the man-machine interaction module, the failure diagnosis and protection module, the SiC high-frequency drive module, the load electrical signal detection module and the non-contact arc initiation module are respectively connected to the DSC controller;

the failure diagnosis and protection module is further connected to the SiC inverter module and the power transformer, respectively;

the SiC high-frequency drive module is also connected to the SiC inverter module; and the load electrical signal detection module is also connected to the SiC rectification and smoothing module.

2. The SiC inverted plasma cutting power supply according to claim 1, characterized in that:

the power-frequency rectification and filtering module comprises a rectifier BR1, an inductor L1, and a capacitor C11;

the SiC inverter module includes SiC power switching devices Q1, Q2, Q3, and Q4; resistors R1, R2, R3, and R4; and capacitors C1, C2, C3, C4, and Cr;

the power transformer includes a transformer T1, a capacitor C12, and a resistor R12;

the SiC rectification and smoothing module includes SiC rectifier diodes D1, D2, D3, and D4; capacitors C5, C6, C7, C8, C9, and C10; resistors R5, R6, R7, R8, and R9; piezoresistors YR1, YR2, YR3, and YR4; and an inductor L2;

the noise suppression module is connected to an input end of the rectifier BR1; the inductor L1 and the capacitor C11 are connected in series, and then connected in parallel to an output end of the rectifier BR1;

the capacitor C11 is connected in parallel with a series circuit composed of the SiC power switching devices Q1 and Q2, and is connected in parallel with a series circuit composed of the SiC power switching devices Q3 and Q4;

the resistor R1 and the capacitor C1 are connected in series and then connected in parallel to the SiC power switching device Q1;

the resistor R2 and the capacitor C2 are connected in series and then connected in parallel to the SiC power switching device Q2;

the resistor R3 and the capacitor C3 are connected in series and then connected in parallel to the SiC power switching device Q3;

the resistor R4 and the capacitor C4 are connected in series and then connected in parallel to the SiC power switching device Q4;

a connection point of the SiC power switching devices Q1 and Q2 is connected to a connection point of the SiC power switching devices Q3 and Q4 through the capacitor Cr and a primary side of the transformer T1;

the capacitor C12 and the resistor R12 are connected in series and then connected in parallel to the primary side of the transformer T1;

a secondary side of the transformer T1 is connected in parallel with a series circuit composed of the SiC rectifier diodes D1 and D2, and is connected in parallel with a series circuit composed of the SiC rectifier diodes D3 and D4;

the capacitor C5 and the resistor R5 are connected in series and are respectively connected in parallel with the SiC rectifier diode D1 and the piezoresistor YR1;

the resistor R6 and the capacitor C6 are connected in series and are respectively connected in parallel with the SiC rectifier diode D2 and the piezoresistor YR2;

the capacitor C7 and the resistor R7 are connected in series and are respectively connected in parallel with the SiC rectifier diode D3 and the piezoresistor YR3;

the resistor R8 and the capacitor C8 are connected in series and are respectively connected in parallel with the SiC rectifier diode D4 and the piezoresistor YR4;

the connection point of the SiC rectifier diodes D1 and D2 is connected to the connection point of the SiC rectifier diodes D3 and D4 through the inductor L2 and the capacitor C9;

the resistor R9 and the capacitor C10 are connected in parallel to the capacitor C9, respectively;

one end of the capacitor C10 is connected to a positive end of the load, and an other end of the capacitor C10 is connected to a negative end of the load through a primary side of the coupling transformer T2; and a secondary side of the coupling transformer T2 is connected to the non-contact arc initiation module.

3. The SiC inverted plasma cutting power supply according to claim 1, characterized in that:

the non-contact arc initiation module includes a trigger of Model IC1 555, an SiC-type field effect transistor Q110, a step-up transformer T103, a rectifier bridge B101, dischargers 101 and 102, a high-voltage charging capacitor C106, and other peripheral auxiliary circuits.

4. The SiC inverted plasma cutting power supply according to claim 1, characterized in that:

the SiC high-frequency drive module includes field effect transistors M201, M202, M203, and M204; transformers T201 and T202; four SiC drive circuits, and other peripheral auxiliary circuits.

5. The SiC inverted plasma cutting power supply according to claim 1, characterized in that:

the load electrical signal detection module includes a current sampling circuit and a voltage divider sampling circuit;

the current sampling circuit includes a Hall current sensor, a chip U301 of Model AD629, a chip U302 of Model OP177, and other peripheral auxiliary circuits; and the voltage divider sampling circuit includes a voltage dividing unit composed of resistors R401 and 402, a chip U401 of Model LF353, a chip U402 of Model HCNR201, and other peripheral auxiliary circuits.

6. The SiC inverted plasma cutting power supply according to claim 1, characterized in that:

the failure diagnosis and protection module includes an overvoltage-undervoltage monitoring circuit, a phase loss detection circuit, and an overheat detection circuit;

the overvoltage-undervoltage monitoring circuit includes a bridge circuit composed of resistors R513, R514, R517, and R518; a VCC DC source: comparators U501 and U502; optocouplers U515 and U516; and other peripheral auxiliary circuits; and the phase loss detection circuit includes a comparator U503, an optocoupler U514, and other peripheral auxiliary circuits.

7. The SiC inverted plasma cutting power supply according to claim 1, characterized in that:

the noise suppression module includes a three-phase common mode inductor $L_{cm}$, a three-phase differential mode inductor $L_{dm}$, an X capacitor, a Y capacitor, and a leak resistor.

8. The SiC inverted plasma cutting power supply according to claim 1, characterized in that:

the DSC controller includes a DSC microprocessor embedded with an FREERTOS system, a power supply unit, an external clock oscillating unit, a reset unit, and a JTAG debug interface.

* * * * *